US008162489B2

(12) United States Patent
Saito

(10) Patent No.: US 8,162,489 B2
(45) Date of Patent: Apr. 24, 2012

(54) VIDEO PROJECTION SYSTEM

(75) Inventor: Takeshi Saito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 477 days.

(21) Appl. No.: 12/265,756

(22) Filed: Nov. 6, 2008

(65) Prior Publication Data

US 2009/0122274 A1 May 14, 2009

(30) Foreign Application Priority Data

Nov. 14, 2007 (JP) ................................ 2007-295038

(51) Int. Cl.
*G03B 21/22* (2006.01)
(52) U.S. Cl. ........................................ 353/119; 353/122
(58) Field of Classification Search .................... 353/49, 353/30–34, 61, 62, 72, 119, 97; 362/85; 352/35; 348/744
See application file for complete search history.

(56) References Cited

U.S. PATENT DOCUMENTS

| 5,639,152 | A | 6/1997 | Nelson | |
| 6,379,012 | B1* | 4/2002 | Enochs et al. | 353/79 |
| 6,755,541 | B2* | 6/2004 | Nakano et al. | 353/119 |
| 2004/0036845 | A1* | 2/2004 | Hoffmeister et al. | 353/79 |
| 2007/0146649 | A1* | 6/2007 | Daniel et al. | 353/99 |

FOREIGN PATENT DOCUMENTS

| JP | 11-119343 | 4/1999 |
| JP | 2002-202487 | 7/2002 |
| JP | 2005-141065 | 6/2005 |
| JP | 2006-259252 | 9/2006 |

OTHER PUBLICATIONS

Translation of Applicant Cited Prior Art JP 2002-202487.*

* cited by examiner

*Primary Examiner* — Francis M Legasse, Jr.
*Assistant Examiner* — Jerry Brooks
(74) *Attorney, Agent, or Firm* — Antonelli, Terry, Stout & Kraus, LLP.

(57) ABSTRACT

A roll bar for protecting a projection mirror is attached so as to avoid exerting an external force to the projection mirror portion, direct thereto upon a turnover the projection apparatus. Further, in the case of no attachment of the roll bar for protecting the projection mirror portion, the projector apparatus is prevented from being started. Further, when the projector apparatus is carried away, the roller bar for protecting the projection mirror serves as a handle.

16 Claims, 8 Drawing Sheets

VIDEO PROJECTION SYSTEM

INCORPORATION BY REFERENCE

The present application claims priority from Japanese application JP2007-295038 filed on Nov. 14, 2007, the content of which is hereby incorporated by reference into this application.

BACKGROUND OF THE INVENTION

1. Field of the Invention

The present invention relates to a technology for providing a projector apparatus.

2. Description of Related Art

The projector apparatus is adapted to modulate a light beam from a light source by means of a image display element such as a liquid crystal panel in response to an image signal so as to produce an optical image (the so-called picture image), and then to project the optical image onto a projection surface such as an outside screen or a wall surface by means of a projection lens or a projection mirror. These years, there have been prosperously used, as the projector apparatus, projectors in which the distance to the projection surface (projection display distance) can be extremely shortened in the case of projection onto the projection surface such as an outside screen (Refer to Patent Document 1 and Patent Document 2).

Patent Documents 1 and 2 disclose a projector apparatus in which, as shown, for example, in FIG. 1 in Patent Document 2, a display light beam having an image (optical image) which is produced through modulation in an image display element within a housing, in response to an image signal, is emitted from the housing through a light output opening of the housing, and is then reflected by a projection mirror standing upright on the outer wall surface of the housing so as to be enlarged and projected onto an outside projection surface. Further, when this projector apparatus is not used, the projection mirror is folded down onto the outer wall surface of the housing in order to cover the light output opening. With the configuration as stated above, since the projection mirror which serves as a part of the housing, can be pulled up so as to set up a projection optical system for the screen during the use thereof while the projection mirror can be folded down during no use thereof, the projector apparatus can be miniaturized as a whole, thereby it is possible to extremely facilitate the handing of the projector apparatus. Further, during no use thereof, since the opening can be covered by the projection mirror, it is possible to prevent invasion of dust.

Patent Document 1: JP-A-2005-141065
Patent Document 2: JP-A-11-119343

In the projector apparatus disclosed in Patent Document 1 or 2 as stated above, the projection mirror is pulled up so as to stand upright on the outer wall surface of the housing during the use thereof, being opened to a predetermined angle. Thus, for example, there would be possibly caused such a risk that the reflection surface of the projection mirror scratches or the position of the projection mirror is deviated from its adjusted set position, being caused by a turnover of the projector apparatus (as will be detailed later in this embodiment). Should the projection mirror have any scratch, this scratch would be reflected into a projected image. Further, should the position of the projection mirror be deviated from its adjusted set position, there would be caused a problem such as a positional deviation of a projected image or a defocus of the image. However, the above-mentioned Patent documents fail to take into sufficient consideration with the protection of the projection mirror against any breakage or damage thereof.

By the way, the arrangement in which the projector apparatus is set up is selected in accordance with a used condition such as a position where an image is projected or a direction of the projection, that is, either one of a permanent set-up arrangement, a suspension arrangement from a ceiling and a vertical arrangement (the so-called downward projection arrangement or desk-top arrangement) is selected. Among these set-up arrangements, in particular, the downward projection arrangement (the vertical arrangement or the desk-top arrangement) for inclining the direction of image projection downward, would possibly cause the projector apparatus to be unexpectedly turned over by the user since the gravitational center of the apparatus becomes unstable (will be detailed later in this embodiment).

Further, there would possibly be caused such a failure that the projector apparatus is accidentally turned over when the projector apparatus is displaced. That is, in the conventional technology, there would be possibly caused such a problem that the projection mirror is broken or damaged due to a turnover of the projection apparatus due to erroneous handling of thereof by the user.

SUMMARY OF THE INVENTION

The present invention is devised in view of the above-mentioned problems, and accordingly, an object of the present invention is to provide a projector apparatus incorporating a protection mechanism for preventing a projection mirror from being exerted with any external force.

To the end, according to the present invention, there is provided a projector apparatus attached thereto with a roll bar for protecting the projection mirror from damage or breakage in order to decreasing an external force which is exerted to a projection mirror upon a turnover.

Alternatively, in order to achieve the above-mentioned object, according to the present invention, there is provided a projector apparatus comprising a light source portion, an image display portion, an optical system for irradiating an illumination light beam from the light source portion, onto the image display portion, a projection mirror for projecting a display light beam from the image display portion by way of the image display portion, a housing accommodating the light source portion, the image display portion or the optical system, a rotary mechanism portion for rotatably attaching the projection mirror to the housing, and a control portion for controlling at least the light source portion and the image display portion, wherein the projection mirror is opened when the projector apparatus is used, and a roller bar is incorporated to the housing in the vicinity of the projection mirror.

Further, in the above-mentioned projector apparatus, a detecting portion for detecting the above-mentioned roller bar in order to prevent the projector apparatus from being operated if the above-mentioned roller bar is not attached.

Further, in the above-mentioned projector apparatus, the above-mentioned roller bar is used as a handle when the projector apparatus is carried away.

According to the present invention, the exertion of an external force exerted to the projection mirror, caused by a turnover of the projector apparatus, can be reduced, thereby it is possible to reduce the possibility of occurrence of erroneous failure such as breakage or damage.

Other objects, features and advantages of the invention will become apparent from the following description of the embodiments of the invention taken in conjunction with the accompanying drawings.

DETAILED DESCRIPTION OF THE INVENTION

Figure 1:
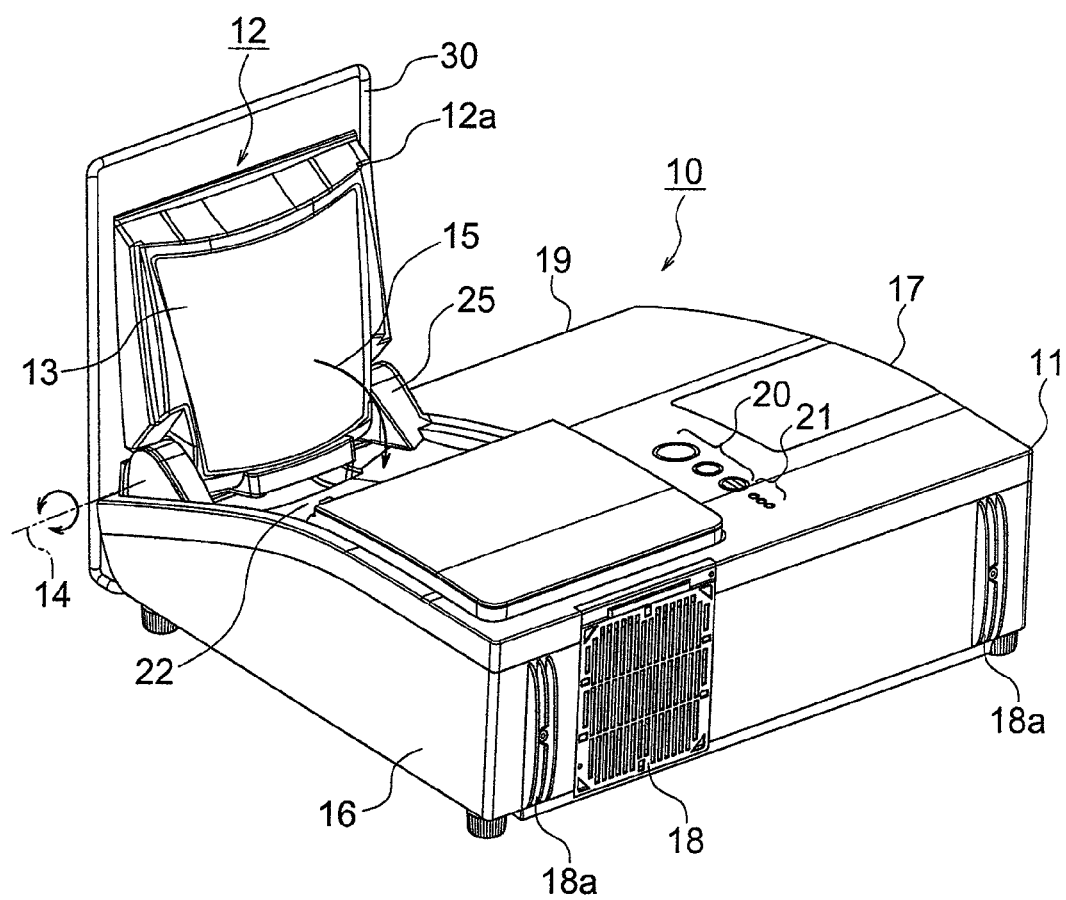
FIG. 1 is an external perspective view illustrating a projector apparatus in an embodiment of the present invention.

Explanation will be hereinbelow made of a best mode for implementing the present invention with reference to the accompanying drawings. It is noted that like reference numerals are used to denote like parts throughout the drawings. Further, no duplicate explanation will be made to those which will have been once explained in order to avoid complexity in explanation. Further, in the following explanation, a liquid crystal panel is used as the image display element. However, the present invention should not be limited thereto.

The present invention is characterized by the provision of a roll bar for preventing a projection mirror which is set up on the outer wall surface of a housing, from being damaged or broken when a projector apparatus is turned over.

FIG. 1 is an exterior view illustrating a projector apparatus in this embodiment, having a projection mirror which has been pulled up and fixed at its operating position.

As shown in FIG. 1, the projector apparatus 10 in this embodiment comprises a housing 11, a projection mirror portion 12 which can be received in an opening 22 in the housing 11, a roll bar 30 mounted on the housing 11, and an image display portion (which will be detailed later with reference to FIG. 6) which is accommodated in the housing 11. Further, there are provided a panel portion 16 having connectors for the connection to cables for a power source and image signals, control signals and the like on one side surface of the housing 11 (the left side surfaced in this case) as viewed on the drawing sheet, and an exhaust portion 17 having exhaust ports for cooling medium on the other side surface. Further, there are provided an air intake portion 18 having intake ports for the cooling medium in front of the drawing sheet, and an exhaust portion for discharging gas for refrigerant such as air, at the rear surface opposite to the intake portion. Moreover, there are provided a plurality of manipulation buttons 20, an indicator 20 and the like on the outer wall surface (which will be referred to as "upper surface" for the sake of convenience) of the housing 11 on which the projection mirror portion 12 is mounted.

It is noted that the air intake portion 18 is formed therein with a plurality of the intake ports for introducing a refrigerant gas such as air, and accordingly, protrusions 18a are provided for always introducing air even though the surface formed therein with the intake portion 10 is laid underneath as the projector apparatus is set in, for example, its vertical arrangement.

The projection mirror portion 12 incorporates a projection mirror 13 for enlarging an image from the image display element which is not shown, and then reflecting the image onto a surface (which is not shown) to be irradiated, such as a screen outside of the projector apparatus, and a cover 12a integrally incorporated therewith. The projection mirror 13 has, of course, a sculptured surface profile for satisfactorily compensating aberration.

Further, the projection mirror portion 12 is attached to a rotary mechanism portion 25 provided to the outer wall surface (which is the upper surface in this embodiment) of the housing, and accordingly, is rotatable around a rotating axis 14 indicated by a one-dot chain line. When it is not used, the projection mirror portion 12, is received in an opening portion 22 in the housing 11 as shown by the arrow 15, and when it is used, it is pulled up in the direction opposed to the arrow 15, and is set upright on the housing 11 for the projection onto the surface to be irradiated (for example, a screen). With this configuration, the projector apparatus can be miniaturized as a whole, and can be handled in an extremely easy manner. Further, upon no use, the opening portion 22 is closed by the projection mirror portion 12 (the opening portion 22 is covered), thereby it is possible to prevent invasion of dust.

It is noted that the rotation of the projection mirror 12 around the rotating axis 14 may be made, either manually or automatically. In the case of automatic rotation, a mirror rotating motor which is not shown, is incorporated in the housing 11 for the projection mirror portion 12, for rotating the projection mirror portion 12 through the intermediary of a rotary mechanism portion (which is not shown), that is, it carries out opening and closing motion so as to cover the opening portion 22 in the housing 11.

By the way, should the light source be energized in the condition that the projection mirror portion 12 is closed (that is, the opening portion 22 is covered with the projection mirror portion 12), a light beam emitted from the light source would be absorbed in the housing so as to raise the temperature, and as a result, there would be caused the risk that the service life of an optical component (such as a liquid crystal panel or a polarizer) which has a low temperature tolerance is shortened. Accordingly, in this embodiment, an opening/closing detecting switch (which will be detailed with reference to FIG. 6) for detecting opening or closing of the projection mirror portion 12 is incorporated in the rotary mechanism portion 21 in order to prevent the light source from being energized in the condition that the projection mirror portion 12 is closed (refer to FIG. 7 which will be detailed later).

The image display portion which will be described later with reference to FIG. 6, incorporates, within the housing 11, a liquid crystal display panel serving as the image display element, a light source, an illumination optical system for transmitting a light beam emitted from the light source onto the liquid crystal display panel, and an output lens for transmitting an optical image (picture image) formed in the liquid crystal display panel to the projection mirror portion 12. Further, the image display portion is adapted to modulate (through the so-called light intensity modulation) a light beam emitted from the light source by way of the illumination optical system in accordance with an image signal which is not shown, in the liquid crystal panel so as to produce an optical image (picture image), and leads the optical image (picture image) onto the projection mirror portion 12 through the opening portion 22 by means of the output lens. That is, the projection optical system in the projector apparatus is composed of the output lens which is not shown, and projection mirror portion 12.

The roll bar 30 is a protecting means for preventing the projection mirror portion from being damaged in, for example, the case that the projector apparatus falls down by accident. For example, should the reflection surface of the projection mirror 13 be scratched by a turnover or the like, scratches would be visible in the projected image. Further, should the position of the reflection surface of the projection mirror 13 is deviated from a adjusted set position in the projection mirror portion, a problem of dislocation of an image, defocus of an image or the like would be caused. Thus, in this embodiment, the roll bar has a height which is higher than the height of the projection mirror portion 12 measured from the upper surface of the housing 11 (or from the bottom surface opposed to the upper surface of the apparatus) when the projection mirror portion stands upright, in order to prevent the mirror portion from being exerted with an external force which causes any damage or breakage thereto (explanation will be detailed later with reference to FIG. 3).

Since the projector apparatus 10 is configured as stated above, an image light beam which is produced in the image display portion and is then emitted from the opening portion 22 of the housing 11 is reflected by the projection mirror 13 in the projection mirror portion 12 which has been secured at a predetermined operating angle (predetermined operating position), and is then projected onto a surface to be irradiated, such as an external screen.

Explanation will be hereinbelow made of various set-up configurations of the projector apparatus with reference to FIGS. 2A-2D. These years, the set-up conditions of the projector apparatus have been becoming various, depending upon its use purpose, without limitation, and accordingly, there have been required projector apparatuses which are capable of being set in various set-up configurations including an upward projection set-up in which the direction of projection is upward (for example, a direction toward the ceiling), a downward projection set-up (the so-called stand-up arrangement or a desk-top arrangement) in which the direction of the projection is downward, in addition to a stationary set-up configuration and a suspension arrangement.

Figure 2A:
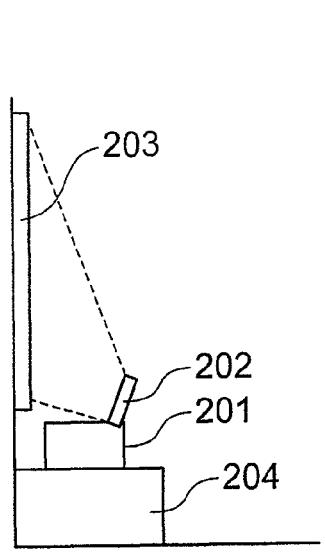
FIGS. 2A-2D are views for explaining set-up configurations of the projector apparatus in this embodiment, as an example.
Figure 2B:
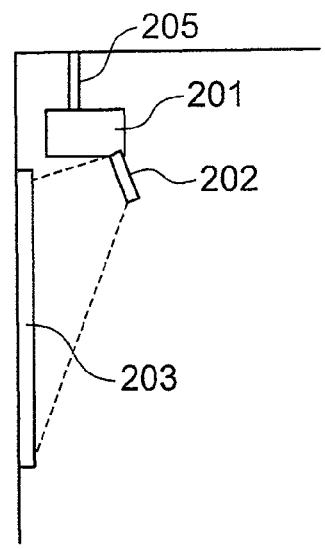
Figure 2C:
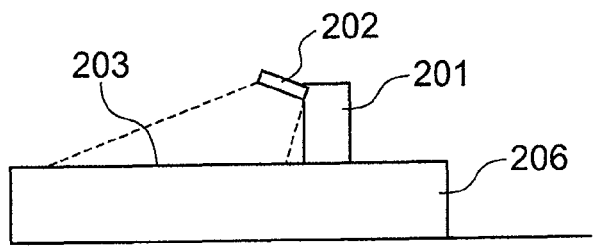
Figure 2D:
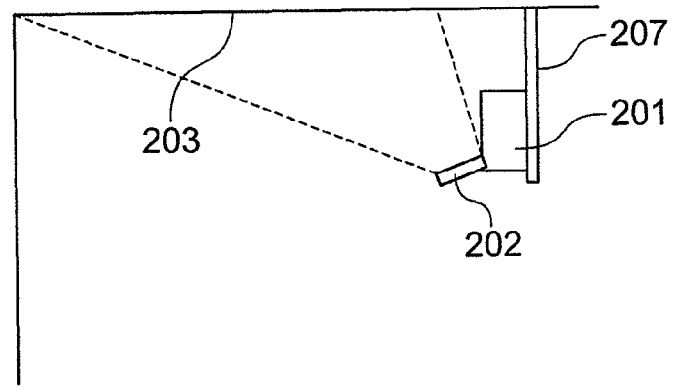

FIGS. 2A-2D are views illustrating examples of set-up configurations of the projector apparatus. As to the set-up configurations, that is, there are various set-up arrangements including a stationary type set-up (stationary set-up) arrangement as shown in FIG. 2A in this figure, a suspension set-up arrangement as shown in FIG. 2B, a stand-up (desk-top) type arrangement (the so-called downward projection set-up arrangement, stand-up arrangement or desk-top arrangement) as shown FIG. 2C, and a underneath surface type arrangement (upward projection arrangement) as shown in FIG. 2D.

In the stationary set-up arrangement shown in FIG. 2A, a projector apparatus 201 and a projection mirror portion 202 are set on a table 204, and accordingly, an image to be projected is projected onto a vertical irradiation surface 203 from the projection mirror portion 202 as indicated by the broken lines.

In the suspension arrangement shown in FIG. 2B, the projector apparatus 201 is suspended from the ceiling by a pillar 205, and accordingly, an image to be projected is projected onto a vertical irradiation surface 203 from the projection mirror portion 202 as indicated by the broken lines.

In the stand-up downward projection arrangement shown in FIG. 2(D), the projector apparatus is set on a table 206 or a desk which also serves as a surface 203 to be irradiated, and accordingly, an image to be projected is projected onto the horizontal irradiation surface 203 from the projection mirror portion 202 as indicated by the broken lines. It is not always necessary to set both projector apparatus and surface to be irradiated on one and the same base.

In the upward projection arrangement shown in FIG. 2(D), the projector apparatus 201 is suspended from the ceiling by a pillar 207, and accordingly, an image to be projected is projected onto a horizontal surface 203 to be irradiated at the ceiling from the projection mirror portion 202 as indicated by the broken lines.

Among the above-mentioned set-up arrangements, as examples, if the downward projection arrangement (stand-up arrangement) in which the direction of the image projection is set to be downward as shown in FIG. 2(D), is used as the set-up arrangement of the projector apparatus in this embodiment, the projection mirror portion 12 is pulled up from a position where the projection mirror portion 12 is fold down on the upper surface of the housing, so as to stand upright in the operating condition of the projector apparatus 10, and accordingly, the gravitational center of the projector apparatus 10 is further away from the desk thereabove so as to become unstable, the user (who is not shown) would, in particular, possibly fall down the projector apparatus by accident.

Figure 3:
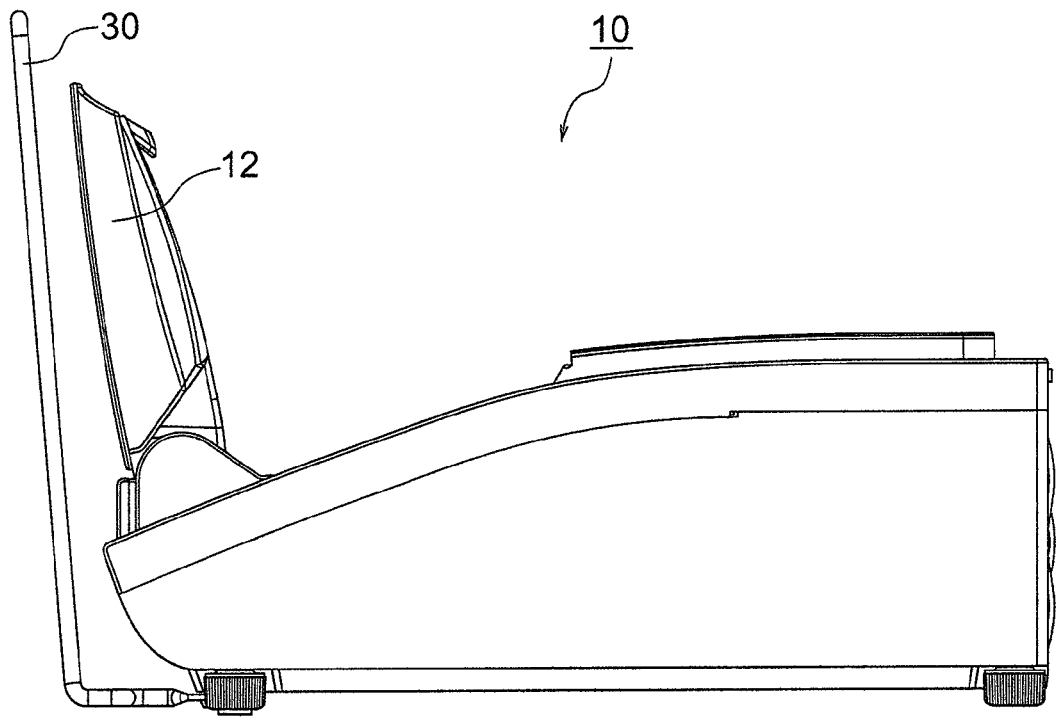
FIG. 3 is a side view illustrating the projector apparatus incorporating a roll bar in the embodiment of the present invention.
Figure 4:
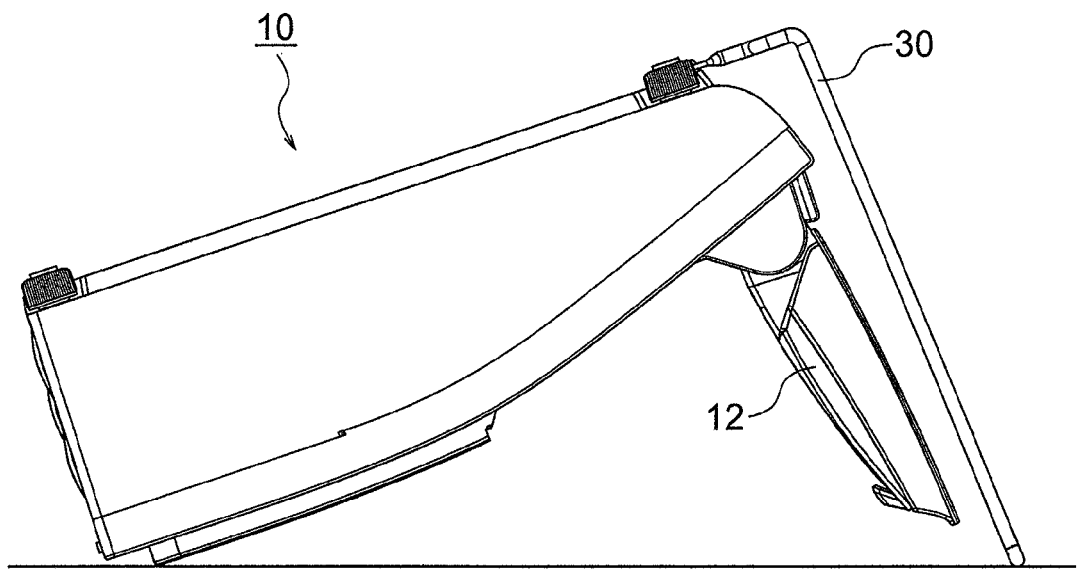
FIG. 4 is a view illustrating the projector apparatus in the embodiment of the present invention, in a turnover condition.
Figure 5:
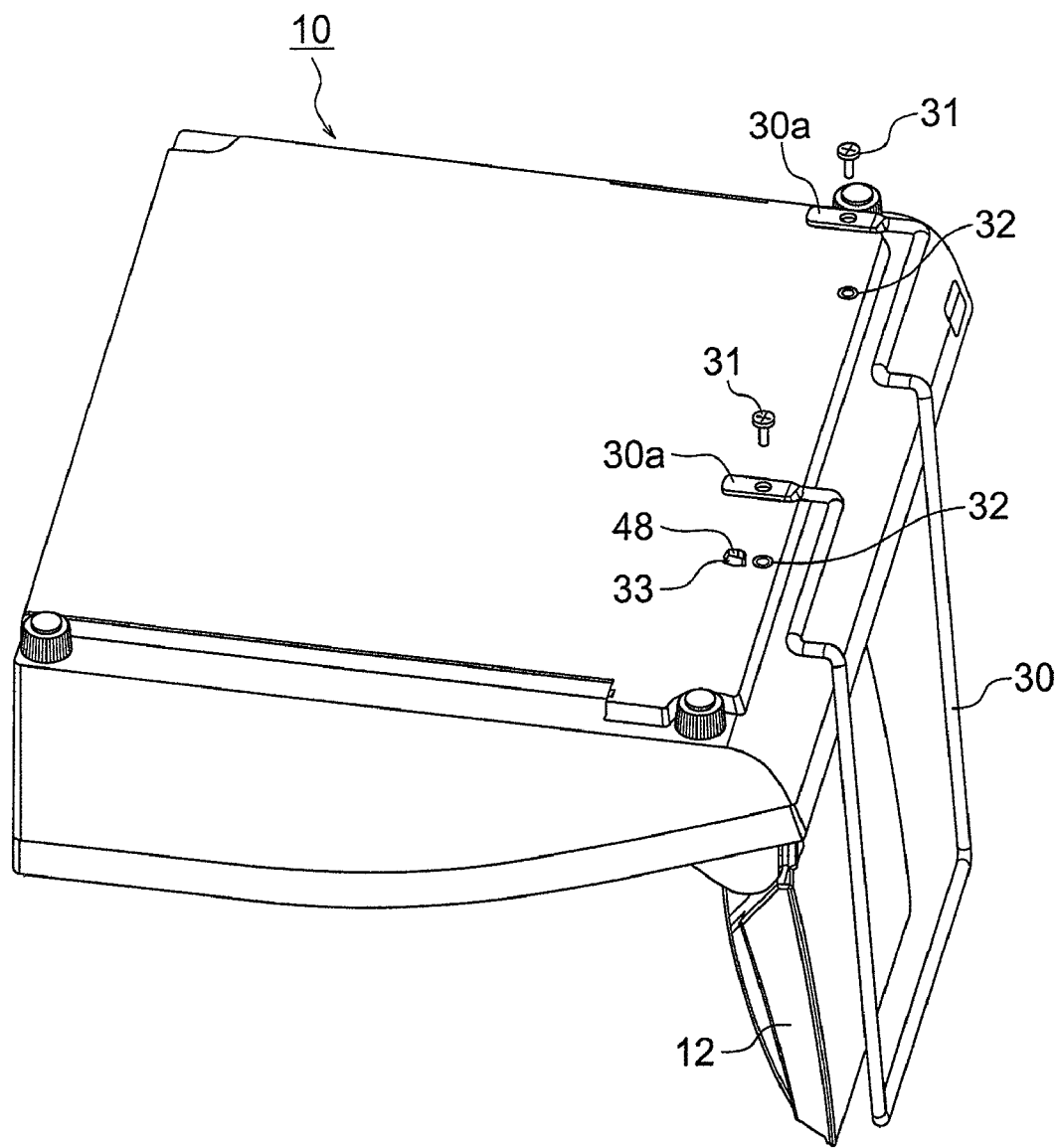
FIG. 5 is a perspective view schematically illustrating the attachment condition of the roll bar in the embodiment of the present invention.

Explanation will be made of the roll bar 30 in this embodiment, for protecting the projection mirror portion 12 from damage and breakage caused by a turnover or the like, with reference to FIGS. 3, 4 and 5. FIG. 3 is a side view illustrating the projector apparatus incorporating the roll bar in this embodiment. FIG. 4 is a view illustrating the projector apparatus in a turnover condition. FIG. 5 is a perspective view schematically illustrating an attached condition of the roll bar as viewed from the bottom surface side of the projector apparatus in this embodiment.

In this embodiment, the roll bar 30 is fixed at its one end part 30a to screw fixing parts 32 at the bottom surface of the projector apparatus 20 by means of screws 31. Further, as clearly understood from FIG. 3, the roll bar 30 has an L-like shape as shown in a side view, so as to avoid interfering with the projection mirror portion 12 during opening and closing of the latter, and also has a height which is set to be higher, by a predetermined value, than the projection mirror portion 12 and which is measured from the bottom surface of the housing 11 when the projection mirror portion 12 stands upright. Thus, even though the projector device 10 is turned over by accident as shown in FIG. 4, the projection mirror portion 12 can be prevented from being made into contact with the desk surface. That is, the roll bar 30 has the length that the projection mirror portion 12 does never make contact with the desk surface even though the projector apparatus 10 is turned over.

Figure 8A:
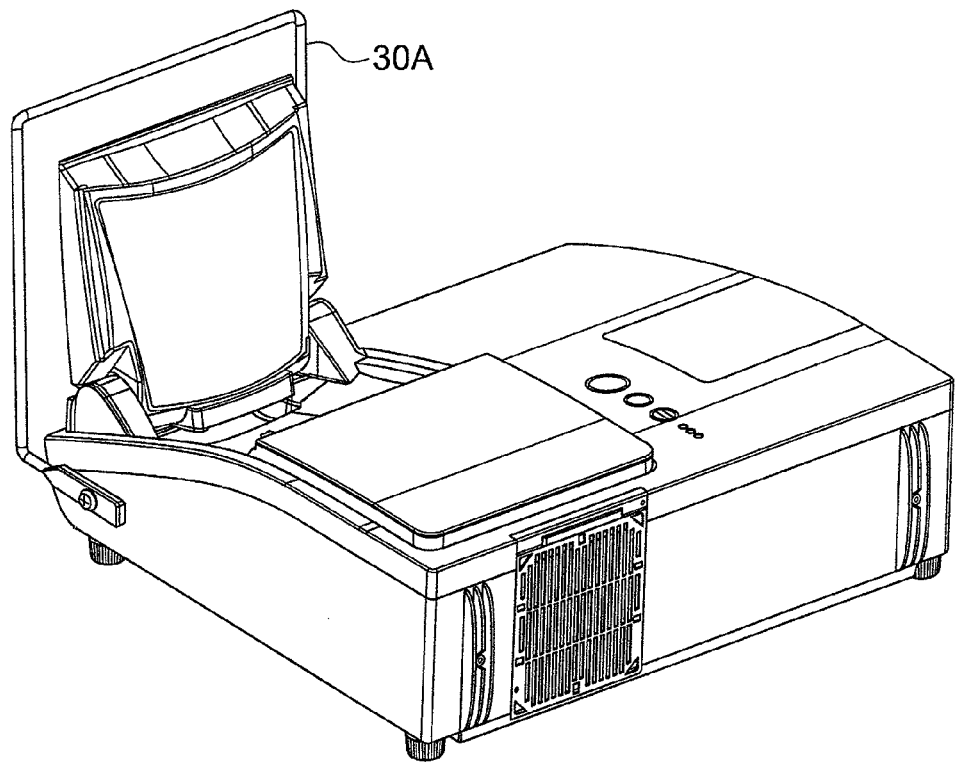
FIGS. 8A and 8B are views illustrating the attachment of the roll bar in another embodiment of the present invention.
Figure 8B:
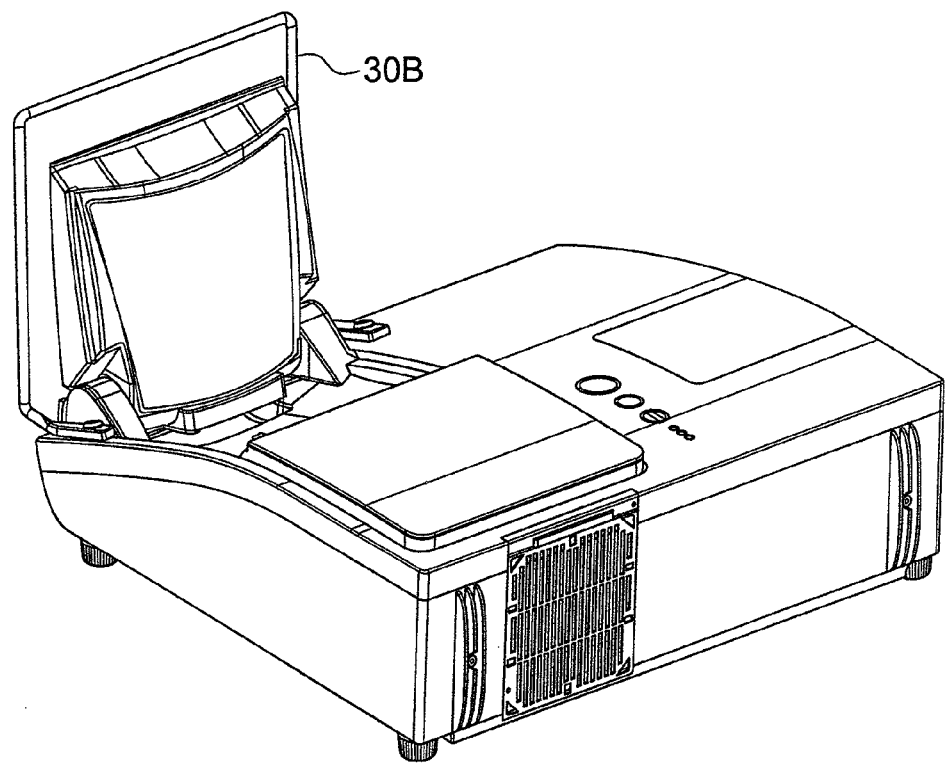

It is noted that explanation will be made of the roll bar which is attached to the bottom surface of the projector apparatus in this embodiment, but the position where the roll bar is attached should not be limited to this case. For example, a roll bar 30A may be provided to a side surface of the housing 11 as shown in FIG. 8A, or a roll bar 30B may be provided to the upper surface of the housing 11, as shown in FIG. 8B.

It is noted that explanation has been made, in this embodiment, of the case that the roll bar 30 is fixed in such a way that it is secured at its opposite ends by screws 31. However, the invention should not be specified to this screw fixing way.

Further, in the roll bar 30 in this embodiment is bent in a crank-like shape in its opposite end parts which are fixed by the screws 31. The bending in the crank-like shape can exhibit the effect that a stress exerted to the screw fixing part 32 at the bottom surface of the housing 11 can be eased.

With the configuration as stated above, even through the user turns over the projector apparatus by accident, no external force caused by the turnover is exerted to the projection mirror portion 12, direct thereto, thereby it is possible to prevent occurrence of damage or breakage to the projection mirror portion 12.

However, in the removable case that the roll bar 30 is fixed to the bottom surface of the projector apparatus 10 by, for example, the screws 3, the projector apparatus would be possibly used such a condition that the roll bar 30 has been removed therefrom, and accordingly, it cannot be said that the above-mentioned countermeasure for preventing damage by accident such as a turnover is perfect.

Thus, in the projector apparatus 10 in this embodiment, as shown in FIG. 5, a square hole 33 is formed in the vicinity of the screw fixing part 32 where the roll bar 30 is attached, at the bottom surface of the projector apparatus 10, and a push-type roll bar detecting switch 48 for detecting the attachment of the roll bar 30 is incorporated in the square hole 33. Estimation is now made such that a push part of the roll bar detecting switch 48 is exposed from the square hole 33. One end part 30a of the roll bar 30 on the screw fixing side is planar, and accordingly, the push part of the roll bar detecting switch 48 is pressed down by the planer end part 30a of the roll bar 30 when the end part 30a of the roll bar 30 is fixed to the screw fixing part 32. Thus, the roll bar detecting switch 30 is turned on.

With the configuration as stated above, in the condition that the roll bar 30 is not attached, the roll-bar detecting switch 48 is turned off. Meanwhile, in the condition that the roll bar 30 is attached, the roll bar detecting switch 48 is turned on. Accordingly, it is possible to detect the condition as to whether the roll bar 30 is attached or not. Further, by detecting the turn-on or -off of the roll bar detecting switch 48, it is possible to control the projector apparatus 10 so that the projector apparatus 10 is prevented from being energized if the roll bar 30 is attached.

Next, explanation will be made of the outline configuration of the projector apparatus in this embodiment with reference to FIG. 6 which is a block diagram.

Figure 6:
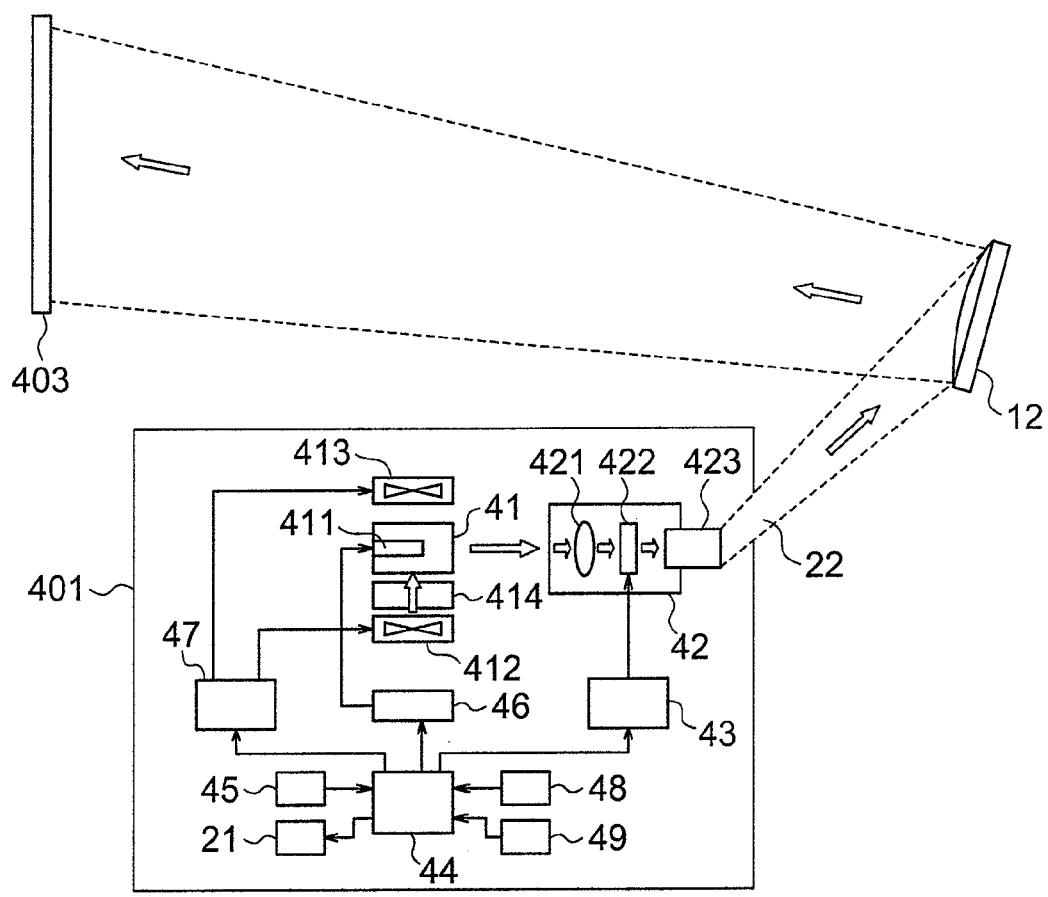
FIG. 6 is a block diagram schematically illustrating the projector apparatus in the embodiment of the present invention.

Referring to FIG. 6, the projector apparatus is composed of a housing portion 401 accommodated in the housing 11 and including circuit blocks and the image display portion, and the projection mirror portion 12. The image display portion for forming an image is composed of a light source portion 41 and an optical unit 42. A light beam L from the light source portion 41 is incident upon the optical unit 42 which is composed of an illumination optical system 421, a liquid crystal panel serving as an image display element, and an output lens 423. The illumination optical system 421 causes the light quantity distribution of the light beam L emitted from the light source portion 41 to be uniform, and then irradiates the light beam L onto the liquid crystal panel 422. The liquid crystal display panel 422 is driven by a display drive circuit 43 so as to modulate the light beam L in accordance with an image signal in order to produce an optical image (the so-called picture image). The thus formed optical image (the so-called picture image) is projected onto the surface to be energized such as an external screen or a wall surface, from the output opening portion 22 for the output lens by way of the projection mirror portion 12.

It is noted that FIG. 6 schematically shows, for convenience on the explanation, the projection light beam emitted from the output opening portion 22 for the output lens 423, the projection mirror portion 12, the reflection light beam which is the output projection light beam reflected upon and the surface 403 to be irradiated. That is, the positions, the angles, the sizes, the directions and the like thereof are not precisely shown in this figure.

The projector apparatus is controlled by a control portion 44 (which will be referred to as "microcomputer") comprising a CPU (Central Processing Unit) which is operated under a program stored in a ROM (Read Only Memory). The microcomputer 44 carries out a predetermined process, depending upon push buttons on a control panel 45 manipulated by the user. For example, the microcomputer turns on or off the light source (for example, there is used, as the light source, a discharge lamp which will be referred to as a light source lamp) 411 of the light source portion 41 through the intermediary of a light source drive circuit 46, and also energizes or deenergizes a fan 412 for cooling the interior of the light source portion 41, a fan 413 for cooling the outer surface of the outer skin of the light source portion 41, a duct 414 and the like through a fan power source circuit 47 in response to the turn-on or off of the light source (lamp) 411.

Further, it controls the display drive circuit 43 so as to display an image, and further, controls the indicator 21 so turn on the same as necessary. Further, the microcomputer receives any information from the roll bar detecting switch 49 which has been hereinabove explained with reference to FIG. 5, and carries out the operation only when the attachment of the roll bar is confirmed. Further, it receives an information from the opening/closing detecting switch 49 for detecting an opening or closing of the projection mirror portion 12, and turns on the light source (lamp) 411 only when the projection mirror portion 12 is opened.

Figure 7:
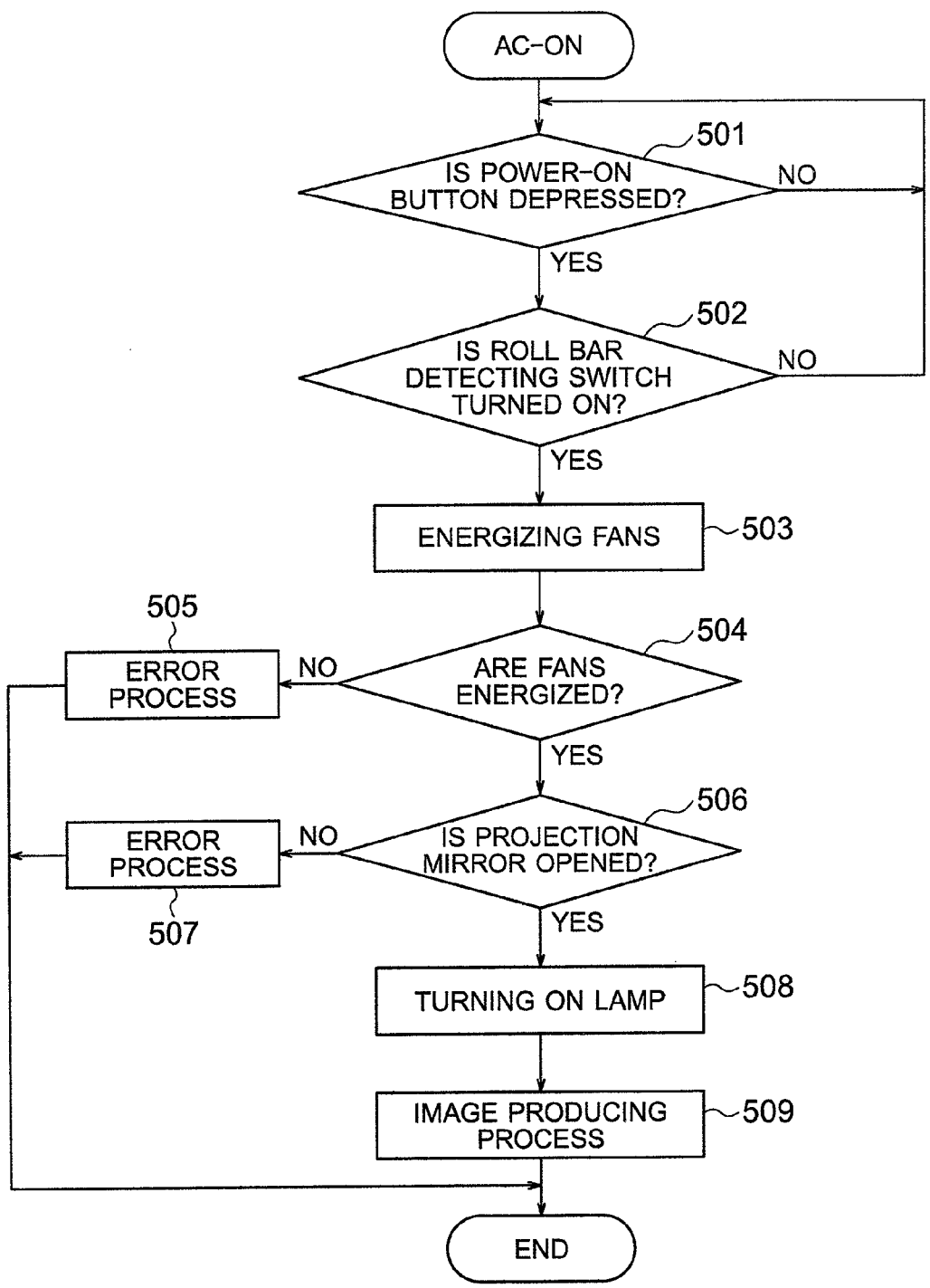
FIG. 7 is a flow chart for explaining an operation, as an embodiment, of the projector apparatus in the embodiment of the present invention.

Next, explanation will be made of the operation of the projector apparatus in the embodiment, with reference to FIG. 7 which is a flowchart.

Estimation is herein made such that the projection mirror portion is closed during no use thereof or in a stand-by condition. However, it may be opened in the standby condition as necessary although it is closed in during no use thereof.

In view of convenience for the explanation, assumption is made such that an AC power is turned off in the projector apparatus. When an AC switch which is not shown is turned on by the user, the microcomputer 44 comes into a stand-by condition while it monitors at predetermined periods whether a power-on push button is manipulated or not (Step 501). When the power-on push button is depressed at Step 501, an image producing process (a power-on process) subsequent to step 502, for producing an image are carried out.

After the image producing process (in the power-on process) is initiated, at first, the microcomputer 44 confirms at step 502 whether the roll bar 30 is attached or not in accordance with a state of the roll bar detecting switch 48 for detecting the attachment of the roll bar 30. If it is attached, step 503 is carried out, but it is not attached, step 501 is again carried out. It is noted that this embodiment should not be limited to the above-mentioned process. For example, there may be carried out the error process that an indicator for the indication of no attachment of the roll bar within the indicator is turned on so as to set up a stand-by condition, and then, this process is completed.

Further, the roll bar detecting switch 48 is should not be limited to a switch type, but any of various components for detecting the attachment of the roll bar 30 may be used. In view of this fact, there may be called a detecting part, instead of the detecting switch.

At Step 503, the microcomputer 44 energizes the cooling fans 412, 413, and Step 504 is carried out.

At step 504, the microcomputer 44 checks whether the cooling fans are surely energized or not. If the energization of the cooling fans is confirmed, step 506 is carried out but if they are not energized, step 505 is carried out. It is noted that the confirmation of energization of the cooling fans can be made by monitoring the rotation of the cooling fans with the use of, for example, a torque meter.

At step 505, the microcomputer 44 carries out the error process that an indicator for the indication of no rotation of the cooling fans in an indicator 21 is tuned on, and accordingly, a stand-by state is set up. Thereafter, the process is completed.

The microcomputer 44 confirms, at step 506, whether the projection mirror portion 12 is opened (that is, the projection mirror portion is pulled up from the position where it covers the opening portion 22) or not is checked in view of a state of the opening/closing detecting switch 49 after the energization of the cooling fans is confirmed at step 504. If is opened, the light source (lamp) 411 is turned on (step 508), then the display drive circuit 43 is controlled so as to carry out an image producing process (step 509), and thereafter, the image producing process is completed. If it is determined that the projection mirror portion 12 is closed, step 507 is carried out.

At step 507, the microcomputer 44 carries out the error process that an indicator for indicating closing of the projection mirror portion in the indicator 21 is turned on, then a stand-by is set up, and the process is completed.

As stated above, in this embodiment, with the provision of the roll bar attachment detecting means, the projector apparatus cannot be used in the case that no roll bar 30 is attached, and accordingly, it is required that the user inevitably attaches the roll bar 30 for protecting the projection mirror portion 12, thereby it is possible to surely prevent the projection mirror portion from being damaged or broken.

Further, the above-mentioned roll bar 30 can be also used as a handle with which the user carries the projector apparatus. Thus, the convenience during the handling of the projection apparatus can be enhanced, thereby it is possible to reduce the possibility of occurrence of the risk of such an accidental breakage when the user accidentally slips off the projection apparatus during the handling of the latter, an accidental turnover or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projector apparatus comprising:
   a light source portion;
   an image display portion;
   an optical system configured to irradiate a light beam to the image display portion from the light source portion;
   a projection mirror configured to project an image light beam from the image display portion;
   a housing accommodating at least one of the light source portion, the image display portion, and the optical system;
   a rotary mechanism portion configured to rotatably attach the projection mirror to the housing;
   a control portion configured to control at least the light source portion and the image display portion; and
   a roll bar fixed to the housing in the vicinity of the projection mirror so as to avoid interfering with the projection mirror during opening and closing of the projection mirror, and fixed to a bottom surface of the projector apparatus so as to prevent the projection mirror from being directly exerted with external force.

2. A projector apparatus as set forth in claim 1, wherein the roll bar is configured to prevent the projection mirror from being damaged.

3. A projector apparatus as set forth in claim 1, wherein when the projection mirror is raised from the housing, the roll bar has a height configured to be higher than that of the projection mirror, as measured from the upper surface of the housing, so as to dispose a projecting position of the roll bar by the rotary mechanism portion.

4. A projector apparatus as set forth in claim 1, further comprising:
   a detecting portion configured to detect the roll bar;
   wherein the projector apparatus is prevented from being started if the roll bar is not attached.

5. A projector apparatus as set forth in claim 1, further comprising:
   a detecting portion configured to detect the roll bar;
   wherein the control portion is configured to prevent the projector apparatus from starting its operation if the detecting portion detects no attachment of the roll bar.

6. A projector apparatus as set forth in claim 1, further comprising:
   a detecting portion configured to detect when the roll bar;
   wherein the control portion is configured to indicate no attachment of the roll bar when the detecting portion detects no attachment of the roll bar.

7. A projector apparatus as set forth in claim 1, wherein the roll bar has a handle-like shape configured to allow the projector apparatus to be carried away.

8. A projector apparatus as set forth in claim 1, wherein the control portion is configured to control the rotary mechanism portion that is configured to rotate the projection mirror.

9. A projector apparatus as set forth in claim 1, further comprising:
   a motor configured to rotate the rotary mechanism portion for rotating the projection mirror;
   wherein the control portion is configured to control the motor for the rotation of the rotary mechanism portion.

10. A projector apparatus as set forth in claim 1, wherein the rotary mechanism portion does not have a motor for the rotation thereof, and the rotary mechanism portion is configured to rotate the projection mirror through manual operation.

11. A projector apparatus as set forth in claim 1, wherein the projection mirror is set in a closed condition with respect to the housing when the projector apparatus is not used.

12. A projector apparatus as set forth in claim 1, wherein the light source portion is not turned on when the projection mirror is set in a closed condition with respect to the housing.

13. A projector apparatus as set forth in claim 1, further comprising:
   a detecting portion having a switch configured to detect an opening or closing of the projection mirror;
   wherein the control portion is configured to energize the light source portion when the detecting portion detects an opening condition of the projection mirror.

14. A projector apparatus as set forth in claim 1, further comprising:
   an opening/closing portion having a switch configured to detect an opening or closing of the projection mirror;
   wherein the control portion is configured to prevent the light source portion from being turned on when the opening/closing portion detects a closed condition of the projection mirror.

15. A projector apparatus as set forth in claim 2, wherein the roll bar is configured to prevent the projection mirror from being damaged when the projector apparatus falls upside down.

16. A projector apparatus as set forth in claim 1,
   wherein the roll bar fixed to a bottom surface of the projector apparatus is configured to prevent occurrence of damage or breakage to the projection mirror.

* * * * *